Figure 3:
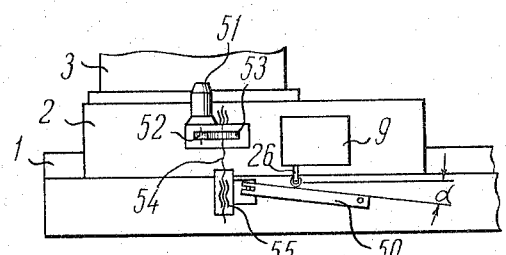

Dec. 13, 1966   N. N. GAEV ET AL   3,290,965
BORING MACHINE

Filed April 26, 1965   2 Sheets-Sheet 1

United States Patent Office 3,290,965
Patented Dec. 13, 1966

3,290,965
BORING MACHINE
Nickolai Nesterovich Gaev, Gessel Iljich Zhevelev, and Felix Davydovich Kochubievsky, all of Novosibirsk, U.S.S.R., assignors to Gosudarstvenny Novosibirsky zavod tjazhelykh stankov i Rrupnykh gidropressov, Novosibirsk, U.S.S.R.
Filed Apr. 26, 1965, Ser. No. 450,960
6 Claims. (Cl. 77—3)

The present invention relates to metal cutting machine tools, in particular to boring machines intended for boring internal surfaces of workpieces which are not rotated during their machining.

The known horizontal boring machines intended for internal taper boring comprise a boring head fastened on the faceplate or in a hollow spindle of the machine.

The toolholder of the head is capable of moving along the ways at a particular angle relative to the axis of rotation of the faceplate. This motion of the toolholder is produced by a screw rotated through a sprocket which is intermittently swivelled through a particular angle for each revolution by means of a positive stop.

There is also known a boring head used in the boring of internal spherical surfaces and fastened on the faceplate or in a hollow spindle of the horizontal boring machine.

The toolholder of such heads is attached to a special swivel plate whose axis of swivel is normal to the axis of rotation of the boring head.

The swivel plate is mechanically connected with a radial carriage of the faceplate which allows the tool to obtain an additional swivel together with the swivel plate during the rotation of the faceplate. This enables the tool to be capable of boring a sperical surface of a certain radius.

The known boring machines will handle only simple internal surfaces of workpieces which are not rotated during their machining, or they will handle tapered, or else only spherical surfaces of one radius. In order to bore another taper or another radius of the spherical hole in the workpiece, it is necessary to reset the boring head or even to replace it.

An object of this invention is to eliminate the above disadvantages.

A principal object of the present invention is to provide a boring machine which allows machining intricate internal surfaces of workpieces, which are not rotated during boring without resetting the boring, machine when varying the machined shape in the workpiece along the axis of the workpiece. Cross grooving is also feasible for such a boring machine.

The above objects are achieved by a boring machine for boring internal surfaces of workpieces which are not rotated during their machining, said machine comprising a headstock which carries a boring head, rotating during operation, with a toolholder and a device for the toolholder with the tool capable of moving the ways, and a work clamp. According to the invention, the machine is provided with a fixed master form whose profile corresponds to that to be obtained on the internal surface of the workpiece while the device for moving the toolholder with the tool is provided with a follow-up system comprising a motor, a transmitter whose tracer slides along the master form during the relative motion of the boring head and the movement of the workpiece along the geometrical axis of the hole being bored, and a repeater receiving signals of said transmitter which is kinematically connected with the toolholder and the motor.

When machining tapered surfaces, the master form used is actually a taper bar attachment with a device for a remote control to vary its inclination angle with respect to the axis of the hole being bored.

A power remote control of the tool traverse relative to the boring head when proceeding from one boring diameter to another during machining internal surfaces whose shape is the same all through while the diameter varies, as well as during cross grooving, is obtained by use of a motor which is employed with the follow-up system disengaged.

A hand remote control of the tool traverse relative to the boring head when proceeding from one boring diameter to another during machining internal surfaces whose shape is the same all through while the diameter varies, as well as during cross grooving, comprises an auxiliary transmitter introduced into the follow-up system.

An axial traverse of the spindle may be efficiently used as a drive for the cross feed of the toolholder. This results in higher productivity of the machine and in a widening of the production scope of heavy-duty boring machines.

Figure 1:
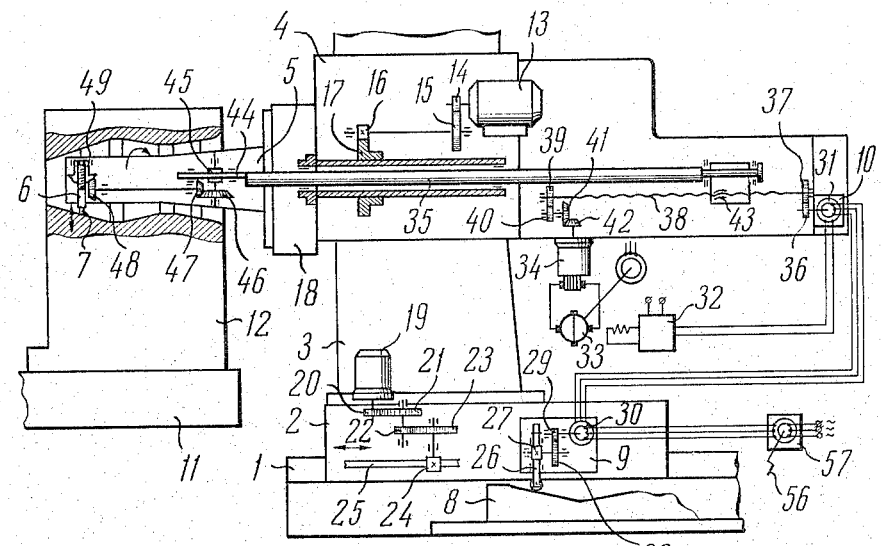
Figure 2:
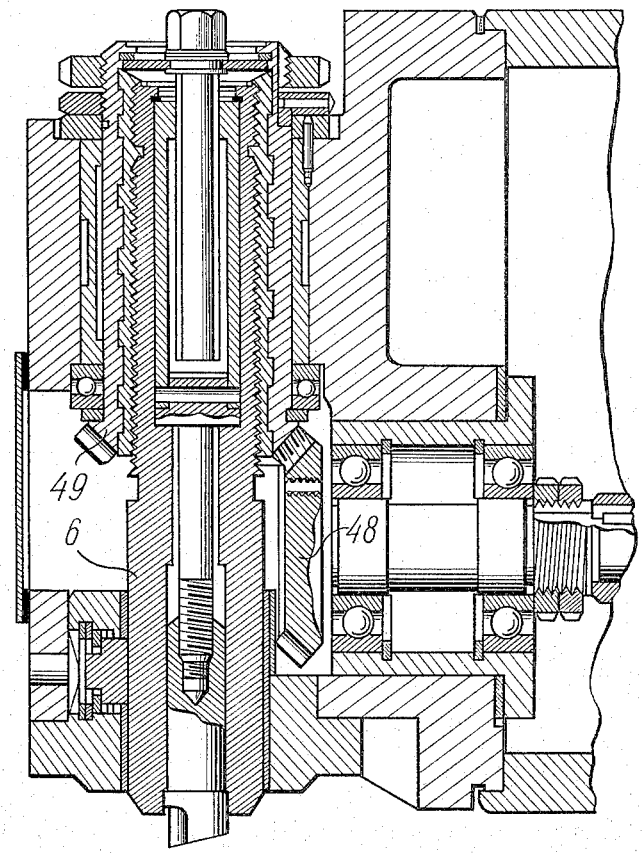

Embodiment of the invention is shown in the appended drawings, wherein:

FIG. 1 is a general diagram of the boring machine;
FIG. 2 is a toolholder with a longitudinal sectional view of a tool;
FIG. 3 is a profile bar attachment (one of the possible embodiments of a master form).

The boring machine, intended for machining internal surfaces of the workpiece which is non-rotatable during its machining, comprises bed 1, slide 2, column 3, headstock 4, boring head 5 with a threaded device for a toolholder 6 with a tool 7 capable of moving in the screw ways form in the boring head 5, master form 8, transmitter 9 of the follow-up system, repeater 10 of the follow-up system and plate 11 to fasten the workpiece 12 thereon.

Following is the working principle of the boring machine:

The boring head 5 with the toolholder 6 and the tool 7 is rotated by an electric motor 13 of the headstock 4 through gears 14, 15, 16 and 17 faceplate 18.

The slide 2 is driven along the bed 1 together with the column 3 and the headstock 4 by an electric motor 19 through gears 20, 21, 22, 23, 24 and rack 25 and the boring head 5 is thereby moved along the axis of its rotation.

When the slide 2 moves together with the transmitter of the follow-up system along the bed 1, the linear motion of the rack tracer 26 which slides along the stationary master form 8 is transformed, through gears 27, 28, and 29, into a rotary motion of the synchro-transmitter 30 of the follow-up system.

Due to kinematic and electric connections, the motion (in magnitude and direction) of the rack tracer 26 is reproduced by the toolholder 6 with the tool 7.

If the rotor of the synchro-repeater 31 does not rotate, the input voltage of the phase-sensitive amplifier 32 will change by an electric angle proportional to the geometric angle of the turn of the synchro-transmitter 30 and D.C. voltage will appear at the input of the phase-sensitive amplifier exciting the magnetic amplifier 33 whose voltage is fed to the electric motor 34 of the spindle drive 35. This is accompanied by turning of the rotor of the synchro-repeater 31 kinematically connected with the electric motor through gears 36 and 37, screw 38 and gears 39, 40, 41 and 42 through an angle preset by the synchro-transmitter 30.

The synchro-repeater 31 is also kinematically connected with the externally-threaded toolholder 6 through gears 36 and 37, screw 38, nut 43, spindle 35, rack 44, gears 45, 46, 47, 48 and gear nut 49.

Thus, the electric motor 34, through gears 42, 41, 40, 39 and then through screw 38, nut 43, spindle 35, rack 44, gears 45, 46, 47 and 48 and gear nut 49, imparts to the toolholder 6 the motion relative to the boring head in the direction normal to the geometric axis of the hole in the workpiece 12 being bored.

If the workpiece is fastened not on the plate 11 but on the table, said workpiece 12 moves along the axis of rotation of the boring head together with said table (this refers to small-size workpieces). In such an operation, the boring head is capable of rotating only, whereas the headstock 4, column 3 and slide 2 are stationary. The transmitter 9 of the follow-up system is attached to the moving table and the master form 8 is fixed on the bed of the table (not shown in the drawing).

For taper boring, a profile bar attachment 50 (FIG. 3) is used as a master form, said attachment being fitted with a device for the remote control of its inclination angle $\alpha$. The inclination angle $\alpha$ of the profile bar attachment 50 is set by the remote control with the aid of an electric motor 51 which moves one end of the profile bar attachment through gears 52, 53, screw 54 and nut 55.

In this instance, the rack tracer 26 of the transmitter 9 of the follow-up system will slide along the profile bar attachment, and the cone angle of the tapered hole of the workpiece will be equal to the inclination angle $\alpha$ of the profile bar attachment 50.

A power remote control of the traverse of the toolholder 6 with the tool 7 relative to the boring head 5 necessary for proceeding from one boring diameter to another during machining internal surfaces of the wokpiece to a shape which is the same all through while the diameter varies, as well as during cross grooving, is effected through an electric motor 34 with the follow-up system disengaged. In this case, the motion from the electric motor 34 is imparted to the tool 7 through gears 39, 40, 41, 42, screw 38, nut 43, spindle 35, rack 44, gears 45, 46, 47, 48, and gear nut 49.

A hand remote control of the traverse of the toolholder 6 with the tool 7 relative to the boring head 5 necessary for proceeding from one boring diameter to another during machining internal surfaces of the workpiece whose shape is the same all through while the diameter varies, as well as during cross grooving, is achieved by rotating the handle 56 of an auxiliary transmitter 57 of the follow-up system (FIG. 1).

In this instance, the follow-up system, through the electric motor 34, rotates the synchro-repeater 31 in synchronism with the transmitter 57 and moves the toolholder 6 with the tool 7 by a particular distance relative to the boring head 5 at a speed corresponding to that with which the handle 56 is rotated.

What we claim is:

1. A boring machine for machining internal surfaces of workpieces which are non-rotatable during machining, comprising a bed; a slide mounted for movement along said bed; a column with a headstock fastened on said slide; a boring head with a toolholder rotating during operation and fastened on said headstock; a stationary master form adapted for being mounted on said bed and having a profile which corresponds to the preset profile to be obtained on the internal surface of the workpiece; a means for securing the workpiece; ways for said toolholder with the tool permitting travel of the latter in a direction transverse to the axis of the workpiece, said ways being formed in said boring head; a device for causing said toolholder with the tool to travel in said ways and having a follow-up system that contains a motor; a transmitter with a tracer sliding along said master form during relative motion of said boring head and workpiece along the axis of the workpiece and a repeater receiving pulses from said transmitter and kinematically connected with said toolholder and the motor of the follow-up system.

2. A boring machine for machining internal surfaces of workpieces which are non-rotatable during machining, comprising a bed; a slide mounted for movement along said bed; a column with a headstock fastened on said slide; a boring head with a toolholder rotating during operation and fastened on said headstock; a profile bar attachment with a device for a remote control of its inclination angle relative to the axis of the workpiece hole, said profile bar attachment being used in the boring of tapered holes and preferably located on said bed; ways for said toolholder and the tool to permit travel of the latter in a direction transverse to the axis of the workpiece, said ways being formed in said boring head; a device for causing said toolholder with the tool to travel in said ways and having a follow-up system that contains a motor, a transmitter and a tracer sliding along said profile bar attachment during relative motion of said boring head and the workpiece along the axis of the workpiece hole; and a repeater receiving signals from said transmitter and kinematically connected with said toolholder and the motor of the follow-up system.

3. A boring machine for machining internal surfaces of workpieces which are non-rotatable during machining, comprising a bed; a slide mounted for movement along said bed; a column with a headstock fastened on said slide; a boring head with a toolholder rotatable during operation and fastened on said headstock; a stationary master form adapted for being mounted on said bed and having a profile which corresponds to the preset profile to be obtained on the internal surface of the workpiece; a means for securing the workpiece; ways for said toolholder with the tool enabling travel of the latter in a direction transverse to the axis of the workpiece, said ways being formed in said boring head; a device for said toolholder with the tool to travel in said ways and having a follow-up system that contains a motor; a transmitter with a tracer sliding along said master form during relative motion of said boring head and workpiece along the axis of said workpiece; a repeater receiving signals from said transmitter and kinematically connected with said toolholder and the motor of the follow-up system; and an auxiliary transmitter in said follow-up system and adapted for a hand remote control of the traverse movement of said toolholder and the tool in said ways when proceeding from one boring diameter to another during machining internal surfaces of workpieces whose shape is the same throughout its length while the diameter varies, as well as during cross grooving.

4. A boring machine as claimed in claim 1 wherein said device for causing transverse movement of the toolholder and tool in the ways comprises a drive shaft mounted for rotation within the boring head and a gear nut driven by said drive shaft and coupled to the toolholder for moving the same in said ways, said drive shaft being coupled to the motor of the follow-up system for being driven thereby.

5. A boring machine as claimed in claim 1 wherein said headstock is slidably mounted on said column and is adapted for being changed in any position therealong for a boring operation for internal surface of workpieces.

6. A boring machine as claimed in claim 4 wherein said motor of the follow-up system is secured to the headstock for movement therewith.

References Cited by the Examiner

UNITED STATES PATENTS 2,457,558  12/1948  Hornfeck.
2,900,586  8/1959   Spencer et al.
2,956,456  10/1960  Bisceglia et al. _____ 77—3

WILLIAM W. DYER, JR., *Primary Examiner.*

G. A. DOST, *Assistant Examiner.*